US012570510B2

(12) United States Patent
Komiyama et al.

(10) Patent No.: US 12,570,510 B2
(45) Date of Patent: Mar. 10, 2026

(54) CARGO HANDLING MANAGEMENT DEVICE, IN-VEHICLE TERMINAL DEVICE, CONTROL METHOD, AND PROGRAM

(71) Applicants: NS Solutions Corporation, Tokyo (JP); TOYOTA JIDOSHA KABUSHIKI KAISHA, Toyota (JP)

(72) Inventors: Masakazu Komiyama, Tokyo (JP); Yasuhito Hanaki, Toyota (JP)

(73) Assignees: NS Solutions Corporation, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 97 days.

(21) Appl. No.: 18/436,737

(22) Filed: Feb. 8, 2024

(65) Prior Publication Data

US 2024/0270545 A1 Aug. 15, 2024

(30) Foreign Application Priority Data

Feb. 14, 2023 (JP) ................................. 2023-020672

(51) Int. Cl.
*B66F 9/075* (2006.01)

(52) U.S. Cl.
CPC .................................. *B66F 9/0755* (2013.01)

(58) Field of Classification Search
CPC ...... B66F 9/0755; B66F 17/003; B66F 17/00; B66F 11/048
See application file for complete search history.

(56) References Cited

U.S. PATENT DOCUMENTS

2014/0267689 A1* 9/2014 Lavoie .................. B60W 10/18 348/113
2020/0094739 A1* 3/2020 Ahamed ............. H05B 47/196

FOREIGN PATENT DOCUMENTS

JP 2008-201554 A 9/2008

OTHER PUBLICATIONS

JP 2010052893, English translation JPO (Year: 2010).*
Communication issued Dec. 24, 2024 in Japanese Application No. 2023-020672.

* cited by examiner

*Primary Examiner* — Mike Anderson
(74) *Attorney, Agent, or Firm* — Sughrue Mion, PLLC

(57) ABSTRACT

An acquisition unit that acquires backward movement information indicating that backward movement of a cargo handling vehicle has been performed, and a detection unit that detects that a cargo handling action by the cargo handling vehicle has been performed based on the backward movement information are included.

9 Claims, 5 Drawing Sheets

CARGO HANDLING MANAGEMENT DEVICE, IN-VEHICLE TERMINAL DEVICE, CONTROL METHOD, AND PROGRAM

BACKGROUND OF THE INVENTION

(1) Field of the Invention

The present invention relates to a cargo handling management device, an in-vehicle terminal device, a control method, and a program.

(2) Description of Related Art

There is a technology for determining a state of a cargo handling vehicle, which is a vehicle used for cargo handling such as a forklift, from a vehicle speed, a load, and the like, and managing an operation status of the vehicle. JP 2008-201554 A discloses a system that collects, on a server, vehicle data regarding a cargo handling action of a forklift using a communication line.

SUMMARY OF THE INVENTION

In the related art such as JP 2008-201554 A, a sensor such as a load sensor and a cargo handling action detection sensor is used to detect the cargo handling action. In a case where a load sensor is used to detect loading of a cargo in cargo handling, the load sensor is attached to a fork or the like. Therefore, in this case, the cost increases by the cost of the load sensor, the time and effort for attaching the load sensor increases, and furthermore, the sensor can be damaged depending on the attaching position of the sensor. It is conceivable to detect the cargo handling action using an image captured by a camera in place of the load sensor, but installation of the camera requires a large-scale alteration, which increases cost and time and effort.

The present invention has been made in view of such a problem, and an object is to more easily detect a cargo handling action.

In order to achieve the above object, a cargo handling management device of the present invention includes: an acquisition unit that acquires backward movement information indicating that backward movement of a cargo handling vehicle has been performed; and a detection unit that detects that a cargo handling action by the cargo handling vehicle has been performed based on the backward movement information.

Another embodiment is an in-vehicle terminal device including: an acquisition unit that acquires a detection result indicating that backward movement of a cargo handling vehicle has been performed; and a transmission unit that transmits, to a cargo handling management device, backward movement information indicating that the backward movement has been performed when the detection result is obtained.

Another aspect is a control method for a cargo handling management device, the control method executed by the cargo handling management device, the control method including: an acquisition step of acquiring backward movement information indicating that backward movement of a cargo handling vehicle has been performed; and a detection step of detecting that a cargo handling action by the cargo handling vehicle has been performed based on the backward movement information.

Another aspect is a control method executed by an in-vehicle terminal device, the control method including: an acquisition step of acquiring a detection result indicating that backward movement of a cargo handling vehicle has been performed; and a transmission step of transmitting, to a cargo handling management device, backward movement information indicating that the backward movement has been performed when the detection result is obtained.

Another embodiment is a program that causes a computer to execute an acquisition step of acquiring backward movement information indicating that backward movement of a cargo handling vehicle has been performed, and a detection step of detecting that a cargo handling action by the cargo handling vehicle has been performed based on the backward movement information.

Another embodiment is a program that causes a computer to execute an acquisition step of acquiring a detection result indicating that backward movement of a cargo handling vehicle has been performed, and a transmission step of transmitting, to a cargo handling management device, backward movement information indicating that the backward movement has been performed when the detection result is obtained.

According to the present invention, it is possible to more easily detect a cargo handling action.

DETAILED DESCRIPTION OF PREFERRED EMBODIMENTS

Here, embodiments of the present invention will be described in the following order.

Figure 1:
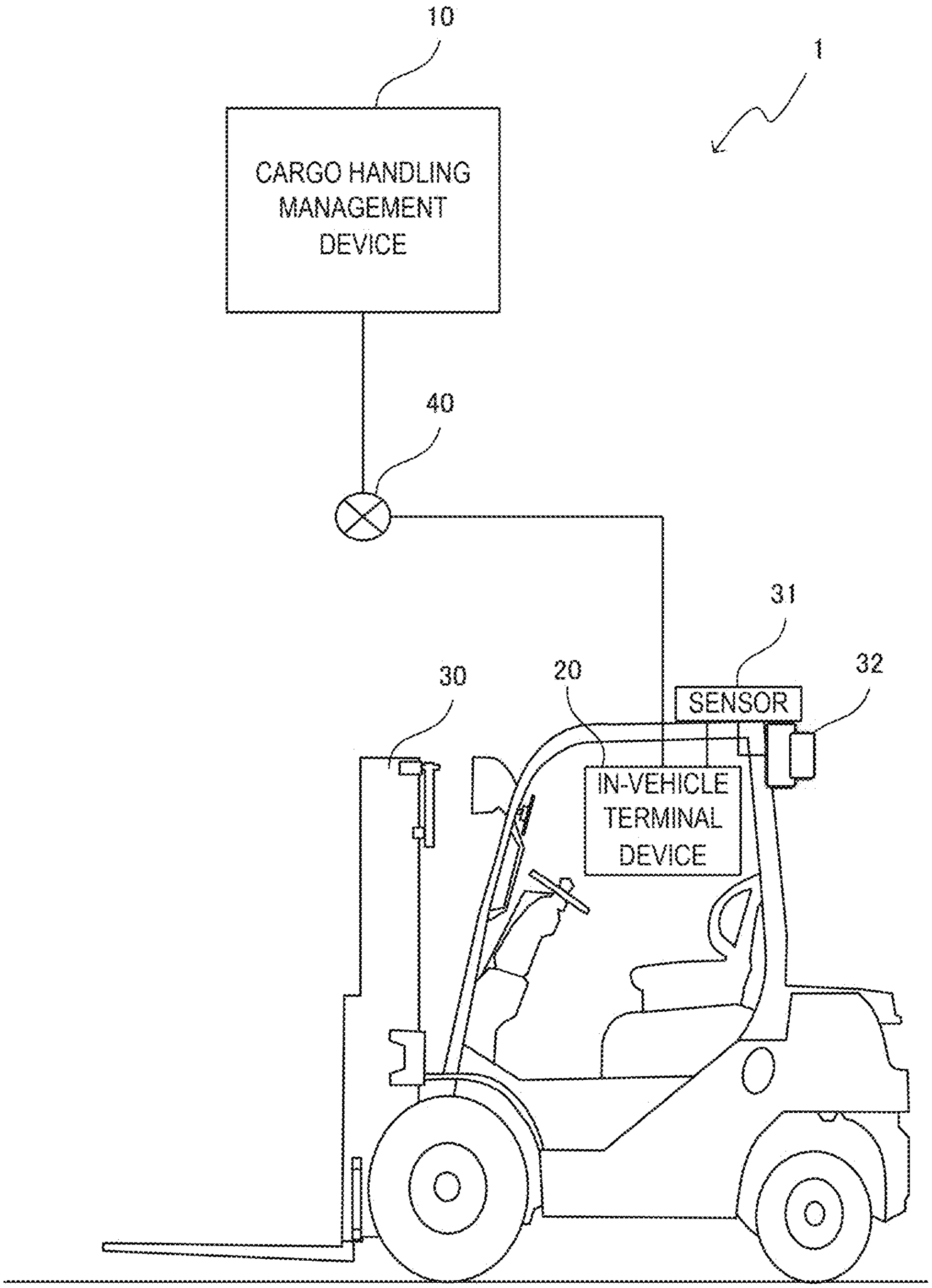
FIG. 1 is a view showing an example of a system configuration of a cargo handling management system.

(1) Configuration of cargo handling management system:
(2) Measurement processing:
(3) Record processing:
(4) Aggregation processing:
(5) Other embodiments:

(1) Configuration of cargo handling management system:

FIG. 1 is a view showing an example of a system configuration of a cargo handling management system 1. The cargo handling management system 1 includes a cargo handling management device 10, an in-vehicle terminal device 20, and a cargo handling vehicle 30. The cargo handling management system 1 is a system that manages a cargo handling action of the cargo handling vehicle 30. More specifically, the cargo handling management system 1 detects the cargo handling action and records the history of the cargo handling action. Here, the cargo handling action includes loading and unloading of a cargo.

The cargo handling vehicle 30 is a moving body used for cargo handling and conveyance of the cargo. The cargo handling vehicle 30 is used, for example, in a site of a factory. In the present embodiment, the cargo handling vehicle 30 is a forklift. The cargo handling vehicle 30 is mounted with the in-vehicle terminal device 20.

The in-vehicle terminal device 20 is communicably connected to the cargo handling management device 10 via a network 40. The network 40 is a network such as a local area network or the Internet. The in-vehicle terminal device 20 may be an information processing device such as a computer incorporated in the cargo handling vehicle 30. The in-vehicle terminal device 20 may be a tablet device, a smartphone, or the like that can be carried by an operator of the cargo handling vehicle 30 in place of being mounted on the cargo handling vehicle 30.

The cargo handling management device 10 receives information related to the cargo handling action of the cargo handling vehicle 30 from the in-vehicle terminal device 20 mounted on the cargo handling vehicle 30, and manages the cargo handling action by the cargo handling vehicle 30 based on the received information. In the embodiment, the cargo handling management device 10 is a server device, but as another example, the cargo handling management device 10 may be another information processing device such as a personal computer (PC), a tablet device, or a smartphone.

In the present embodiment, the cargo handling management system 1 will be described assuming that one cargo handling vehicle 30 mounted with the in-vehicle terminal device 20 is a management target, but as described in a modification described later, a plurality of cargo handling vehicles 30 mounted with the in-vehicle terminal device 20 may be a management target.

The inventors have found that the cargo handling action by the cargo handling vehicle 30 is accompanied by backward movement of the cargo handling vehicle 30. This has caused the inventors to conceive that the cargo handling action can be regarded to have been performed when backward movement of the cargo handling vehicle 30 was performed. According to such finding, when backward movement of the cargo handling vehicle 30 was performed, the cargo handling management system 1 of the present embodiment detects that the cargo handling action has been performed.

The cargo handling management system 1 of the present embodiment determines that backward movement has been performed on condition that a backup light 32 of the cargo handling vehicle 30 is turned on. In the cargo handling vehicle 30, when switching to the back gear is performed for backward movement, the backup light 32 is turned on.

Therefore, turning on of the backup light 32 can be regarded as backward movement of the cargo handling vehicle 30. In order to detect turning on of the backup light 32, the cargo handling vehicle 30 is provided with a sensor 31 for detecting a voltage of the backup light 32.

The in-vehicle terminal device 20 transmits information corresponding to the detection result by the sensor 31 to the cargo handling management device 10, and the cargo handling management device 10 detects that a cargo handling action has been performed when backward movement of the cargo handling vehicle 30 was performed.

Figure 2:
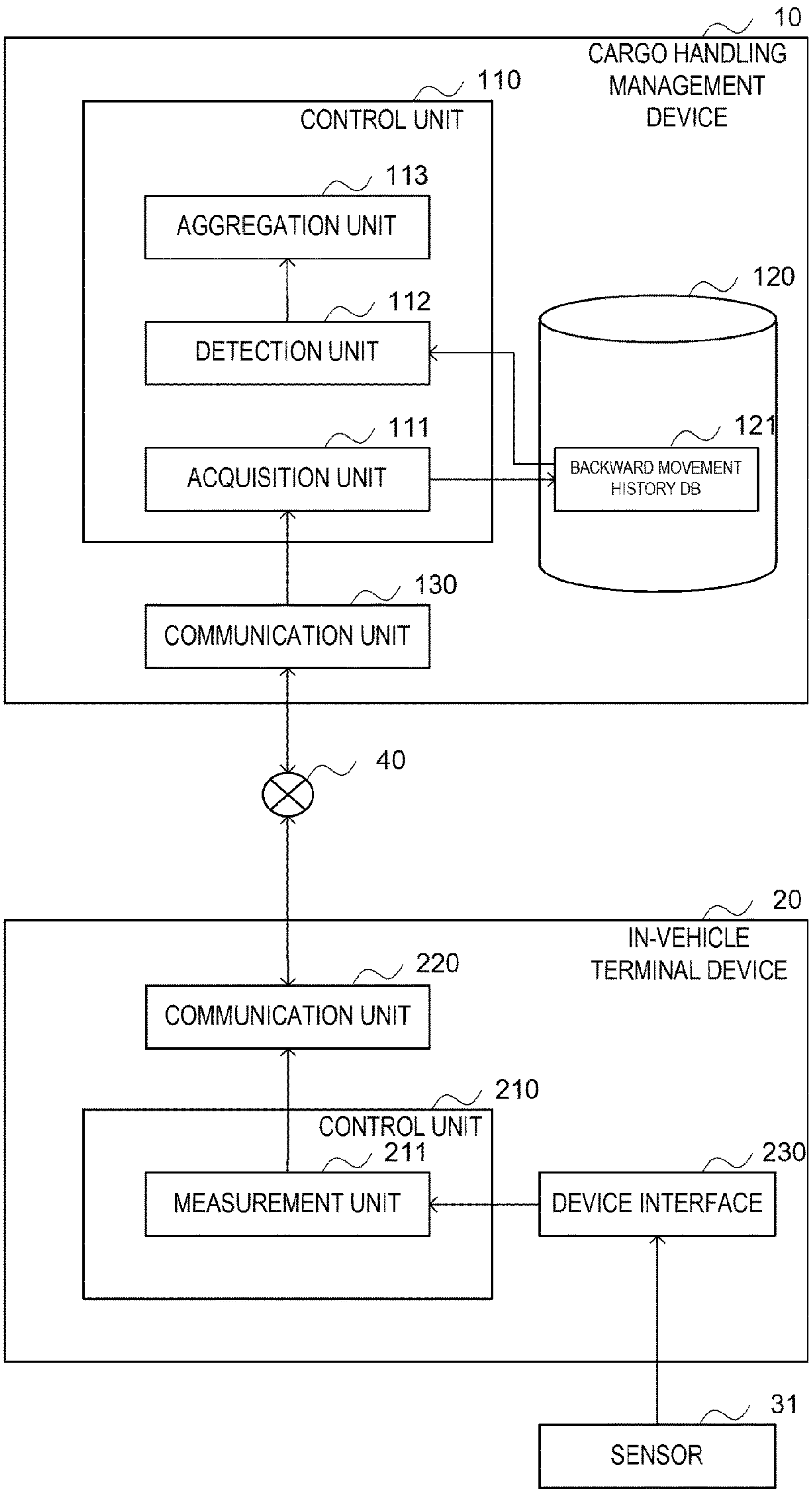
FIG. 2 is a view showing an example of details of each element of the cargo handling management system.

FIG. 2 is a view showing an example of the configuration of the cargo handling management device 10 and the in-vehicle terminal device 20 of the cargo handling management system 1.

The in-vehicle terminal device 20 includes a control unit 210 including a CPU, a RAM, and ROM, a communication unit 220, and a device interface 230. The control unit 210 controls the entire in-vehicle terminal device 20. The communication unit 220 performs communication with an external device such as the cargo handling management device 10 via the network 40 by wire or wirelessly. The device interface 230 is an interface used for communication with the sensor 31.

The CPU of the control unit 210 implements the function of a measurement unit 211 by executing a program stored in the ROM or the like. That is, the processing described as being executed by this function is processing executed by a CPU 101. As another example, the CPU of the control unit 210 may implement these functions and processing by reading a program stored in a recording medium such as an SD card in place of the ROM or the like and executing this program.

The measurement unit 211 detects that backward movement has been performed, and measures a period in which the backward movement was performed. As described above, since it can be regarded that backward movement has been performed when the backup light 32 is turned on, the measurement unit 211 detects turning on of the backup light 32 based on a voltage signal detected by the sensor 31, and acquires a detection result indicating that the backward movement has been performed when the turning on of the backup light 32 is detected. The measurement unit 211 further measures a period in which the backup light 32 is continuously turned on, that is, a period in which backward movement is continued, as a period in which the backward movement was performed. Hereinafter, a period in which backward movement of the cargo handling vehicle 30 was performed is defined as a backward movement period. The measurement unit 211 transmits, to the cargo handling management device 10, information indicating the backward movement period having been measured. When receiving the information on the backward movement period, the cargo handling management device 10 can determine, due to the information, that the cargo handling vehicle 30 has performed backward movement. That is, the information indicating a backward movement period is an example of information indicating that the cargo handling vehicle 30 has performed backward movement, that is, backward movement information. Hereinafter, information indicating a backward movement period is called backward movement information. The measurement unit 211 is an example of an acquisition unit that acquires a detection result indicating that backward movement has been performed, and is an example of a transmission unit that transmits backward movement information to the cargo handling management device 10 when the detection result is obtained.

The cargo handling management device 10 includes a control unit 110 including a CPU, a RAM, and ROM, a recording medium 120, and a communication unit 130. The control unit 110 controls the entire cargo handling management device 10. The recording medium 120 stores various data and programs such as a backward movement history DB 121, which is a database in which backward movement information is accumulated. The communication unit 130 performs communication with an external device such as the in-vehicle terminal device 20 via the network 40 by wire or wirelessly.

The CPU of the control unit 110 implements the functions of an acquisition unit 111, a detection unit 112, and an aggregation unit 113 by executing a program stored in the recording medium 120 or the ROM. That is, the processing described as being executed by these functions is processing executed by the CPU 101. As another example, the CPU of the control unit 110 may implement these functions and processing by reading a program stored in a recording medium such as an SD card in place of the ROM or the like and executing this program.

The acquisition unit 111 acquires backward movement information from the in-vehicle terminal device 20 and records the backward movement information in the backward movement history DB 121 of the recording medium 120.

The detection unit 112 detects the cargo handling action by the cargo handling vehicle 30 based on the backward movement history DB 121.

The aggregation unit 113 aggregates the detection result by the detection unit 112.

Figure 3:
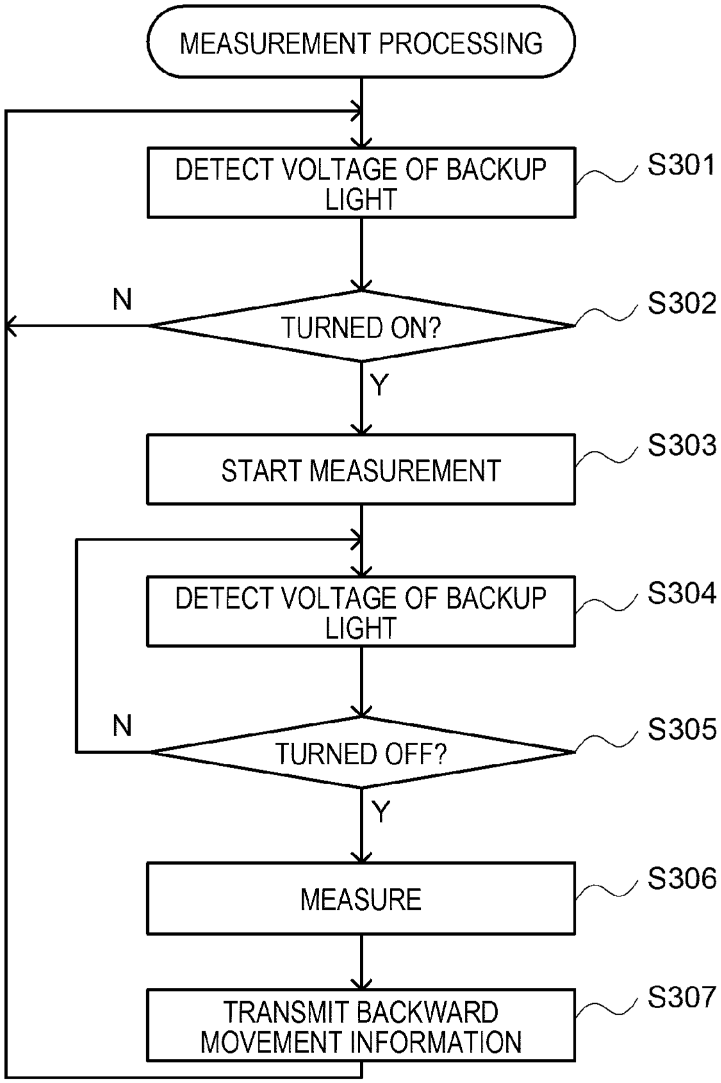
FIG. 3 is a flowchart showing an example of measurement processing.

(2) Measurement Processing:

The measurement processing executed by the in-vehicle terminal device 20 will be described with reference to FIG. 3. The measurement processing is processing of measuring a period in which the backup light 32 of the cargo handling vehicle 30 is turned on.

The control unit 210 starts the measurement processing in response to activation of the cargo handling vehicle 30. As another example, the control unit 210 may start the measurement processing at another timing such as a timing at which a predetermined time has come or a timing at which an instruction to start the processing is received.

In step S301, the measurement unit 211 detects the voltage of the backup light 32 of the cargo handling vehicle 30 from the sensor 31.

Next, in step S302, the measurement unit 211 determines whether or not the backup light 32 of the cargo handling vehicle 30 is turned on based on the voltage detected in the immediately preceding step S301. When the voltage detected in the immediately preceding step S301 is equal to or greater than a predetermined voltage threshold, the measurement unit 211 determines that the backward movement of the cargo handling vehicle 30 has been performed, acquires a detection result indicating that the backward movement has been performed, and advances the processing to step S303. When the voltage detected in the immediately preceding step S301 is less than the predetermined voltage threshold, the measurement unit 211 determines that the backup light of the cargo handling vehicle 30 is turned off and the backward movement of the cargo handling vehicle 30 has not been performed, and advances the processing to step S301.

In step S303, the measurement unit 211 starts measurement of a period in which the backup light 32 is continuously turned on. Specifically, the measurement unit 211 records the time at the time point of processing into the RAM.

Next, in step S304, the measurement unit 211 detects the voltage of the backup light 32 of the cargo handling vehicle 30 via the sensor 31.

Next, in step S305, the measurement unit 211 determines whether or not the backup light 32 of the cargo handling vehicle 30 is turned off based on the voltage detected in the immediately preceding step S304. When the voltage detected in the immediately preceding step S304 is equal to or greater than a predetermined voltage threshold, the measurement unit 211 determines that the backup light 32 of the cargo handling vehicle 30 is turned on, and advances the processing to step S304. When the voltage detected in the immediately preceding step S304 is less than the predetermined voltage threshold, the measurement unit 211 determines that the backup light 32 of the cargo handling vehicle 30 is turned off, and advances the processing to step S306.

In step S306, the measurement unit 211 measures the period in which the backup light 32 is turned on, that is, a period from the time recorded in step S303 to the time point of the processing in step S306 as a backward movement period in which the backward movement was performed.

Next, in step S307, the measurement unit 211 transmits, to the cargo handling management device 10, backward movement information including the backward movement period obtained in step S306. In the present embodiment, the backward movement information includes information on a vehicle ID for identifying the cargo handling vehicle 30, the backward movement period measured in the immediately preceding step S306, and the time (that is, turning off time) at the time point of processing in the immediately preceding step S306. However, when there is only one cargo handling vehicle 30 of the management target, the measurement unit 211 needs not include the vehicle ID in the backward movement information. Thereafter, the measurement unit 211 advances the processing to step S301. The measurement unit 211 ends the measurement processing when the engine of the cargo handling vehicle 30 is stopped. The measurement unit 211 may end the measurement processing at another timing such as when receiving an instruction to end the measurement processing via an operation unit of the in-vehicle terminal device 20.

Figure 4:
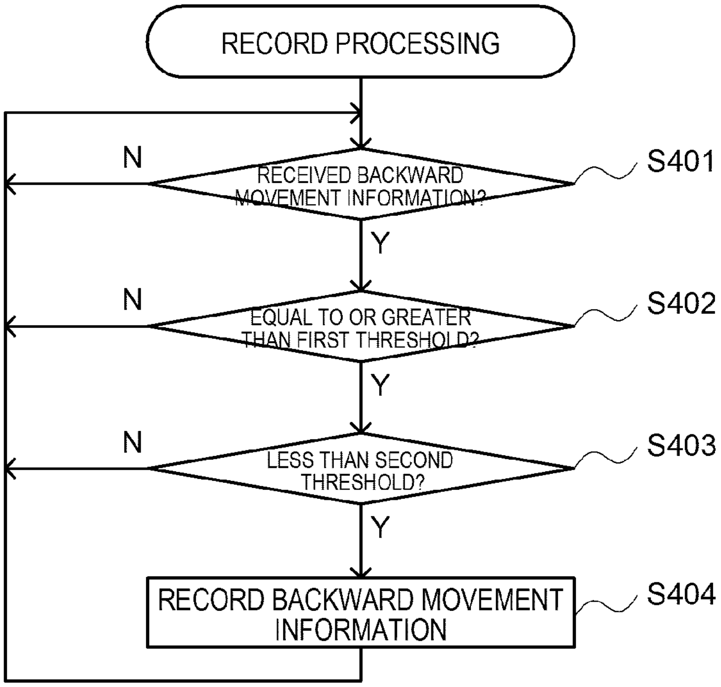
FIG. 4 is a flowchart showing an example of record processing.

(3) Record Processing:

Record processing of backward movement information executed by the cargo handling management device 10 will be described with reference to FIG. 4.

The control unit 210 starts the record processing at a time before the start time of the measurement processing by the in-vehicle terminal device 20 mounted on the cargo handling vehicle 30 of the management target.

In step S401, the acquisition unit 111 determines whether or not backward movement information has been received from the in-vehicle terminal device 20. The acquisition unit 111 advances the processing to step S402 when determining that the backward movement information has been received from the in-vehicle terminal device 20, and repeats the processing of step S401 when determining that the backward movement information has not been received from the in-vehicle terminal device 20.

In step S402, the acquisition unit 111 advances the processing to step S403 when the length of the backward movement period indicated by the backward movement information determined to have been received in the immediately preceding step S401 is equal to or greater than a predetermined first period threshold. The acquisition unit 111 advances the processing to step S401 when the length of the backward movement period indicated by the backward movement information determined to have been received in the immediately preceding step S401 is less than the first period threshold.

In step S403, the acquisition unit 111 advances the processing to step S401 when the length of the backward movement period indicated by the backward movement information determined to have been received in the immediately preceding step S401 is equal to or greater than a predetermined second period threshold longer than the first period threshold. The acquisition unit 111 advances the processing to step S404 when the length of the backward movement period indicated by the backward movement information determined to have been received in the immediately preceding step S401 is less than the second period threshold.

Next, in step S404, the acquisition unit 111 adds, to the backward movement history DB 121 of the recording medium 120, the backward movement information determined to have been received in the immediately preceding step S401. Then, the acquisition unit 111 advances the processing to step S401.

Thus, in the present embodiment, the acquisition unit 111 records backward movement information indicating a period equal to or greater than the first period threshold and less than the second period threshold in the backward movement information received from the in-vehicle terminal device 20, and does not record backward movement information indicating a period less than the first period threshold or equal to or greater than the second period threshold. The cargo handling vehicle 30 may perform backward movement regardless of the cargo handling action, such as backward movement due to an erroneous operation. The cargo handling vehicle 30 tends to continue backward movement for a certain period or longer when performing the cargo handling action. Then, the acquisition unit 111 does not add the backward movement information indicating a backward movement period less than the first period threshold to the backward movement history DB 121 on the assumption that this backward movement information is information not related to the cargo handling action. This first period threshold is a value set based on a measurement result of a period of backward movement performed by the cargo handling vehicle in an actual cargo handling action, for example, and is a value of, for example, 10 seconds, 15 seconds, or the like.

In the cargo handling vehicle 30 in which, for example, the loading platform is present in front of the driver's seat and it is difficult to check the front, it is safer to move backward than to move forward, and there is a case where backward movement is performed in a relatively long distance for a move. On the other hand, the distance of backward movement in the cargo handling action is shorter than that of backward movement for move. The second period threshold is a threshold for distinguishing between the backward movement for such move and the backward movement for the cargo handling action. That is, the acquisition unit 111 does not add the backward movement information indicating a backward movement period equal to or greater than the second period threshold to the backward movement history DB 121 on the assumption that this backward movement information is information related to backward movement for a move, that is, backward movement not related to the cargo handling action. This second period threshold is a value set based on a measurement result of a period of backward movement performed by the cargo handling vehicle in an actual cargo handling action, for example, and is a value of, for example, 30 seconds, 60 seconds, or the like.

Due to this, the acquisition unit 111 prevents the backward movement information not related to the cargo handling action from being used for detection of the cargo handling action, and can reduce erroneous detection of the cargo handling action. Since the acquisition unit 111 does not record unnecessary backward movement information on the recording medium 120, the capacity of the recording medium 120 can be saved.

Figure 5:
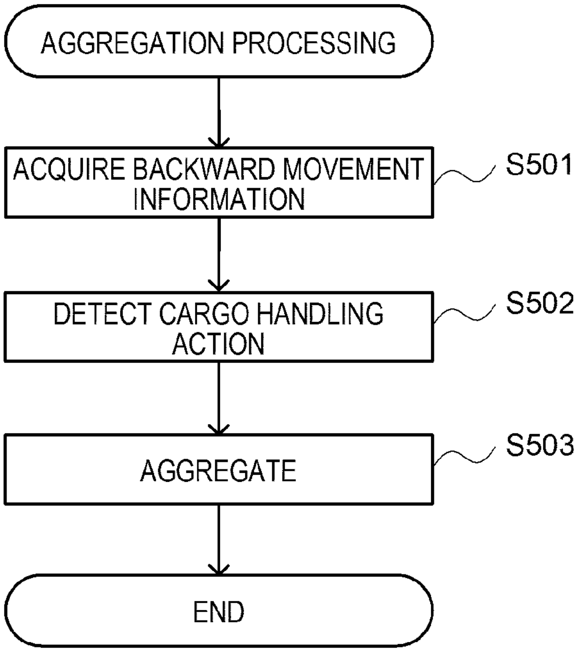
FIG. 5 is a flowchart showing an example of aggregation processing.

(4) Aggregation Processing:

Next, aggregation processing executed by the cargo handling management device 10 will be described with reference to FIG. 5. In the aggregation processing, detection of the cargo handling action is performed, and aggregation regarding information such as a period of the detected cargo handling action is performed.

The control unit 210 starts the aggregation processing at a timing designated via the operation unit of the cargo handling management device 10. However, as another example, the control unit 210 may start the processing of FIG. 5 at another timing such as a timing when a predetermined time has come.

In step S501, the acquisition unit 111 acquires backward movement information recorded as the backward movement history DB 121.

Next, in step S502, the detection unit 112 detects that the cargo handling action by the cargo handling vehicle 30 was performed in the period indicated by the backward movement information for each piece of the backward movement information acquired in step S501, and records a cargo handling action period in the recording medium 120.

Next, in step S503, the aggregation unit 113 performs aggregation processing based on the cargo handling action period obtained in step S502 for each cargo handling vehicle 30. Here, the aggregation processing is a transition of the operating time of each cargo handling vehicle 30, an aggregation of the actual cargo handling action period, and the like. Here, the operating time is an action time of the cargo handling vehicle 30. Furthermore, the aggregation unit 113 may review a work plan from these aggregation results. Here, the work plan includes a start time, a work period, and a work route of the work related to cargo handling of each cargo handling vehicle 30.

As described above, with the configuration of the present embodiment, the cargo handling management system 1 detects that the cargo handling action by the cargo handling vehicle 30 has been performed based on the detection result of backward movement of the cargo handling vehicle 30. Furthermore, the cargo handling management system 1 detects backward movement by turning on of the backup light 32. Thus, according to the cargo handling management system 1, it is possible to more easily detect that the cargo handling action by the cargo handling vehicle 30 has been performed simply by providing the cargo handling vehicle 30 with the sensor for voltage detection of the backup light 32 without installing additional equipment such as a load sensor and a camera for detecting the cargo handling action in the site where the cargo handling vehicle 30 moves such as a factory.

Since it is possible to more easily detect that the cargo handling action has been performed, as a result, it is possible to more easily analyze the operation rate, the work time, and the like of the cargo handling vehicle 30 using the detection result that the cargo handling action has been performed. Such analysis result enables review of the number of cargo handling vehicles, review of the work plan, and the like.

(5) Other Embodiments:

The above embodiment is an example for carrying out the present invention, and various other embodiments can be adopted.

A first modification will be described. The cargo handling management device 10 of the cargo handling management system 1 only needs to detect the cargo handling action by the cargo handling vehicle 30, and needs not detect the period thereof. That is, in this case, the in-vehicle terminal device 20 only detects the presence or absence of backward movement, and transmits backward movement information indicating that the backward movement has been performed to the cargo handling management device 10 when a detection result indicating that the backward movement has been performed is obtained. When receiving the backward movement information, the cargo handling management device 10 detects that the cargo handling action has been performed. As another example, the in-vehicle terminal device 20 may acquire, as backward movement information, the number of times of backward movement performed within a predetermined period by the cargo handling vehicle 30. In this case, for example, the in-vehicle terminal device 20 detects the number of times the backup light 32 of the cargo handling vehicle 30 is turned on within the predetermined period, and transmits, as the backward movement information, the detected number of times to the cargo handling management device 10. The cargo handling management device 10 may acquire the transmitted backward movement information and detect that the cargo handling action has been performed the number of times indicated by the backward movement information within the predetermined period based on the acquired backward movement information.

A second modification will be described. In the above-described embodiment, when the backward movement period indicated by the backward movement information meets the condition of equal to or greater than the first period threshold and less than the second period threshold, the cargo handling management device 10 registers the backward movement information into the backward movement history DB 121. However, even when the backward movement period indicated by the backward movement information does not meet the condition of equal to or greater than the first period threshold and less than the second period threshold, the cargo handling management device 10 may register the backward movement information into the backward movement history DB 121. For example, if the backward movement period indicated by the backward movement information is equal to or greater than the first period threshold, the cargo handling management device 10 may register the corresponding backward movement information into the backward movement history DB 121 even if the backward movement period is equal to or greater than the second period threshold. If the backward movement period indicated by the backward movement information is less than the second period threshold, the cargo handling management device 10 may register the corresponding backward movement information into the backward movement history DB 121 even if the backward movement period is less than the first period threshold. Regardless of the backward movement period indicated by the backward movement information, the cargo handling management device 10 may register the corresponding backward movement information into the backward movement history DB 121.

A third modification will be described. The present modification is a modification corresponding to a case where backward movement information indicating a backward movement period meeting at least one of less than the first period threshold and equal to or greater than the second period threshold is recorded in the backward movement history DB 121, as described in the second modification. In this case, when the backward movement period indicated by the backward movement information acquired from the backward movement history DB 121 is equal to or greater than the first period threshold, the detection unit 112 may detect that the cargo handling action was performed in the corresponding backward movement period. When the backward movement period indicated by the backward movement information acquired from the backward movement history DB 121 is less than the second period threshold, the detection unit 112 may detect that the cargo handling action was performed in the corresponding backward movement period. When the backward movement period indicated by the backward movement information acquired from the backward movement history DB 121 is equal to or greater than the first period threshold and less than the second period threshold, the detection unit 112 may detect that the cargo handling action was performed in the corresponding backward movement period.

A fourth modification will be described. In the above-described embodiment, the in-vehicle terminal device 20 transmits backward movement information including information on the backward movement period to the cargo handling management device 10 regardless of the length of the backward movement period. However, when the backward movement period is equal to or greater than the first period threshold, the in-vehicle terminal device 20 may transmit backward movement information including information on the backward movement period to the cargo handling management device 10. For example, when the backward movement period measured in step S306 is equal to or greater than the first period threshold, the measurement unit 211 may transmit, in step S307, backward movement information including information on the backward movement period to the cargo handling management device 10, and when the backward movement period is less than the first period threshold, the measurement unit 211 needs not transmit the backward movement information.

When the backward movement period is less than the second period threshold, the in-vehicle terminal device 20 may transmit backward movement information including information on the backward movement period to the cargo handling management device 10. For example, when the backward movement period measured in step S306 is less than the second period threshold, the measurement unit 211 may transmit, in step S307, backward movement information including information on the backward movement period to the cargo handling management device 10, and when the backward movement period is equal to or greater than the second period threshold, the measurement unit 211 needs not transmit the backward movement information.

When the backward movement period is equal to or greater than the first period threshold and less than the second period threshold, the in-vehicle terminal device 20 may transmit backward movement information including information on the backward movement period to the cargo handling management device 10. For example, when the backward movement period measured in step S306 is equal to or greater than the first period threshold and less than the second period threshold, the measurement unit 211 may transmit, in step S307, backward movement information including information on the backward movement period to the cargo handling management device 10, and when the backward movement period is less than the first period threshold or equal to or greater than the second period threshold, the measurement unit 211 needs not transmit the backward movement information.

A fifth modification will be described. In the cargo handling management system 1 according to the above-described embodiment, information indicating that the backup light 32 is turned on is acquired as the backward movement information indicating that backward movement of the cargo handling vehicle 30 has been performed. However, the cargo handling management device 10 may acquire another type of information as the backward movement information. For example, the cargo handling management device 10 may acquire, as the backward movement information, information indicating that switching (gear change) to a back gear in the cargo handling vehicle 30 has been performed. In this case, for example, the in-vehicle terminal device 20 detects the switching to the back gear via a sensor included in a switching lever to the back gear. Then, the in-vehicle terminal device 20 measures the period in which the gear is switched to the back gear, and transmits, to the cargo handling management device 10, as the backward movement information, information on the measured period and the time when the switching to the back gear is released.

The information indicating that the backup light 32 is turned on may be any information as long as the recipient of the information can grasp the turning on of the backup light 32, and may be, for example, text, a numerical value, a bit string, binary data such as 0 and 1, or the like. The information indicating that the switching to the back gear has been performed may be any information as long as the recipient of the information can grasp the turning on of the backup light 32, and may be, for example, text, a numerical value, a bit string, binary data such as 0 and 1, or the like.

Even when the backup light 32 is turned on or the gear is switched to the back gear, there is a possibility that backward movement is not actually performed. Therefore, when the backup light 32 is turned on and the accelerator is depressed, the in-vehicle terminal device 20 of the cargo handling management system 1 may determine that the backward movement has been performed, and measure, as the backward movement period, a period in which the backup light 32 is turned on and the accelerator is continuously depressed. Similarly, when the gear is switched to the back gear and the accelerator is depressed, the in-vehicle terminal device 20 may determine that the backward movement has been performed, and measure, as the backward movement period, a period in which the gear is switched to the back gear and the accelerator is continuously depressed. This enables the cargo handling management system 1 to more accurately perform detection of the backward movement and measurement of the backward movement period.

The cargo handling vehicle 30 may include an acceleration sensor, and the in-vehicle terminal device 20 may determine that backward movement has been performed when a backward acceleration is detected by the acceleration sensor, and measure, as the backward movement period, a period in which the backward acceleration is continuously detected. In this case, the cargo handling vehicle 30 needs not include the sensor 31 for detecting the voltage of the backup light 32.

There is a case where the move of the cargo handling vehicle 30 is controlled by an instruction of move including backward movement in response to an operation on a remote operation device (not shown) by a manager or the like. In this case, when backward movement is instructed, the in-vehicle terminal device 20 determines that the backward movement has been performed, and measures, as the backward movement period, a continuous period in which the backward movement is instructed. In this case, the remote operation device and the in-vehicle terminal device 20 are communicably provided via the network 40, the instruction of move is transmitted from the remote operation device to the in-vehicle terminal device 20, and the in-vehicle terminal device 20 controls the move of the cargo handling vehicle 30 in accordance with the move instruction. For example, when the instruction of move to the cargo handling vehicle 30 is given via a button provided in the remote operation device, the in-vehicle terminal device 20 measures, as the backward movement period, a period in which the button is continuously pressed.

A sixth modification will be described. There may be a rule that a predetermined cargo is conveyed only by backward movement for the reason of enhancing safety from the viewpoint of size, weight, and the like. Therefore, when the backward movement period indicated by the backward movement information is equal to or greater than a predetermined period threshold, the cargo handling management device 10 may specify the type of the loaded cargo as this predetermined cargo.

A seventh modification will be described. In place of the cargo handling management device 10, the in-vehicle terminal device 20 may include the functions of the acquisition unit 111 and the detection unit 112. That is, the in-vehicle terminal device 20 may detect that the cargo handling action has been performed based on the backward movement information in addition to the detection of performance of the backward movement and the measurement of the backward movement period.

For example, in the cargo handling vehicle 30, when the cargo of a cargo handling target is present at a high place or the like, there is a case where the cargo of the cargo handling target is checked using a camera included in a loading unit or the like of the cargo handling vehicle 30 during the cargo handling action. Thus, there is a case where a predetermined sensor is used during the cargo handling action in the cargo handling vehicle 30. In such case, when the cargo handling action is detected based on the backward movement information, the in-vehicle terminal device 20 can prevent the sensor from being operated in an unnecessary case by operating this sensor.

In this case, the in-vehicle terminal device 20 may transmit, to the cargo handling management device 10, a detection result that the cargo handling action has been performed in place of transmitting the backward movement information. The cargo handling management device 10 can store the detection result that the cargo handling action has been performed for each cargo handling vehicle 30, and can set the detection result as an aggregation target.

As another example, the in-vehicle terminal device 20 may transmit the detection result of the sensor 31 to the cargo handling management device 10, and the cargo handling management device 10 may perform detection of the backward movement and measurement of the backward movement period.

An eighth modification will be described. In the above-described embodiment, the cargo handling management system 1 detects the cargo handling action for one cargo handling vehicle 30. However, the cargo handling management system 1 may detect the cargo handling action for each of a plurality of cargo handling vehicles 30 each including the in-vehicle terminal device 20. In this case, the cargo handling management system 1 can detect that the cargo handling action has been performed via the in-vehicle terminal devices 20 mounted on the plurality of respective cargo handling vehicles 30, and aggregate the detection results. This enables analysis of the operation rate, the work time, and the like of each of the plurality of cargo handling vehicles 30 from the aggregation result.

Furthermore, the above-described device, program, and method may be implemented as a single device or may be implemented by using a component shared by a plurality of devices, and include various aspects. An appropriate change can be made. For example, some of them are software and some of them are hardware. Furthermore, the invention is also established as a recording medium of a program for controlling the device. Of course, the recording medium of the program may be a magnetic recording medium or a semiconductor memory, and exactly the same is true for any recording medium that will be developed in the future.

What is claimed is:

1. A cargo handling management device comprising:

a processor; and a recording medium; wherein the processor executes a following process by executing a program, the processor acquires backward movement information including a backward movement period in which backward movement of a cargo handling vehicle has been performed;

the processor records the backward movement information including the backward movement period in the recording medium when the backward movement period is equal to or greater than a first period threshold and less than a second period threshold, and does not record the backward movement information including the backward movement period in the recording medium when the backward movement period is less than the first period threshold or equal to or greater than the second period threshold; and the backward movement information includes the backward movement period, a vehicle identification (ID) for identifying the cargo handling vehicle, and ending time of the backward movement;

the processor acquires the backup movement period based on a detected voltage of a sensor of a backup light of the cargo handling vehicle, a detected backward acceleration with respect to the cargo handling vehicle by an acceleration sensor, or a detected switching to a back gear via a sensor included in a switching lever; and processor determines a work plan for handling cargo and a number of cargo handling vehicles based on the recorded backward movement information.

2. The cargo handling management device according to claim 1, wherein the processor acquires the backup movement period based on a period in which a backup light of the cargo handling vehicle is turned on.

3. The cargo handling management device according to claim 1, wherein the processor acquires the backward movement period based on the period in which the backup light of the cargo handling vehicle is turned on and an accelerator of the cargo handling vehicle is continuously depressed.

4. The cargo handling management device according to claim 1, wherein the processor acquires the backward movement period based on the period in which the backward acceleration with respect to the cargo handling vehicle is continuously detected.

5. The cargo handling management device according to claim 1, wherein the processor acquires the backward movement period based on the period in which switching to a back gear in the cargo handling vehicle is performed.

6. The cargo handling management device according to claim 1, wherein the processor acquires the backward movement period based on a period, in which switching to the back gear in the cargo handling vehicle is performed and an accelerator of the cargo handling vehicle is continuously depressed.

7. A cargo handling management method executed by a processor executing a program, the cargo handling management method comprising:

a measuring step of measuring a backward movement period in which backward movement of the cargo handling vehicle has been performed based on a detection signal from a sensor provided on a cargo handling vehicle and detects the backward movement of the cargo handling vehicle;

a determining step of determining whether the backward movement period is greater than or equal to a first period threshold and less than a second period threshold;

a recording step of recording the backward movement information including the backward movement period in a recording medium when the backward movement period is equal to or greater than the first period threshold and less than the second period threshold, and not recording the backward movement information in the recording medium when the backward movement period is less than the first period threshold or equal to or greater than the second period threshold;

wherein the backward movement information includes the backward movement period, a vehicle identification (ID) for identifying the cargo handling vehicle, and ending time of the backward movement; and the backup movement period is acquired based on a detected voltage of a sensor of a backup light of the cargo handling vehicle, a detected backward acceleration with respect to the cargo handling vehicle by an acceleration sensor, or a detected switching to a back gear via a sensor included in a switching lever; and a determining step of determining a work plan for handling cargo and a number of cargo handling vehicles based on the recorded backward movement information.

8. The cargo handling management method according to claim 7, wherein a processor of an in-vehicle terminal device mounted on the cargo handling vehicle executes the measuring step;

the cargo handling management method further comprising a transmission step of transmitting the backward movement information including the backward movement period measured in the measurement step to a cargo handling management device outside of the cargo handling vehicle via a network from the in-vehicle terminal device, a processor of the cargo handling management device executes the determining step, and the recording step.

9. A non-transitory computer readable medium storing a program for causing a computer including a processor and memory to execute a measuring step of measuring a backward movement period in which backward movement of the cargo handling vehicle has been performed based on a detection signal from a sensor provided on a cargo handling vehicle and detects the backward movement of the cargo handling vehicle;

a determining step of determining whether the backward movement period is greater than or equal to a first period threshold and less than a second period threshold;

a recording step of recording the backward movement information including the backward movement period in a recording medium when the backward movement period is equal to or greater than the first period threshold and less than the second period threshold, and not recording the backward movement information in the recording medium when the backward movement period is less than the first period threshold or equal to or greater than the second period threshold;

wherein the backward movement information includes the backward movement period, a vehicle identification (ID) for identifying the cargo handling vehicle, and ending time of the backward movement;

the backup movement period is acquired based on a detected voltage of a sensor of a backup light of the cargo handling vehicle, a detected backward acceleration with respect to the cargo handling vehicle by an acceleration sensor, or a detected switching to a back gear via a sensor included in a switching lever; and determining step of determining a work plan for handling cargo and a number of cargo handling vehicles based on the recorded backward movement information.

* * * * *